United States Patent
Nagumo et al.

(10) Patent No.: US 10,242,191 B2
(45) Date of Patent: Mar. 26, 2019

(54) DYNAMICALLY-LOADED CODE ANALYSIS DEVICE, DYNAMICALLY-LOADED CODE ANALYSIS METHOD, AND DYNAMICALLY-LOADED CODE ANALYSIS PROGRAM

(71) Applicant: NIPPON TELEGRAPH AND TELEPHONE CORPORATION, Chiyoda-ku (JP)

(72) Inventors: Takaaki Nagumo, Musashino (JP); Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 82 days.

(21) Appl. No.: 15/312,952

(22) PCT Filed: May 18, 2015

(86) PCT No.: PCT/JP2015/064178
§ 371 (c)(1),
(2) Date: Nov. 21, 2016

(87) PCT Pub. No.: WO2015/182418
PCT Pub. Date: Dec. 3, 2015

(65) Prior Publication Data
US 2017/0206355 A1 Jul. 20, 2017

(30) Foreign Application Priority Data
May 26, 2014 (JP) ................. 2014-108139

(51) Int. Cl.
*G06F 21/00* (2013.01)
*G06F 21/56* (2013.01)
*G06F 21/62* (2013.01)

(52) U.S. Cl.
CPC ............ *G06F 21/566* (2013.01); *G06F 21/56* (2013.01); *G06F 21/62* (2013.01); *G06F 2221/033* (2013.01)

(58) Field of Classification Search
CPC ......... G06F 21/566; G06F 21/56; G06F 21/62
(Continued)

(56) References Cited

U.S. PATENT DOCUMENTS

2009/0172644 A1  7/2009  Nagarajan et al.
2011/0314337 A1* 12/2011  Sinha .................. G06F 11/3624
                                                        714/37
(Continued)

FOREIGN PATENT DOCUMENTS

CN  103269341 A    8/2013
JP  2013-137612 A  7/2013
JP  2013-232113 A  11/2013

OTHER PUBLICATIONS

Extended Search Report dated Nov. 28, 2017 in European Patent Application No. 15799613.3.
(Continued)

*Primary Examiner* — Anthony D Brown
(74) *Attorney, Agent, or Firm* — Oblon, McClelland, Maier & Neustadt, L.L.P.

(57) ABSTRACT

A dynamically-loaded code analysis device includes a memory unit, an extraction unit, and a specification unit. The memory unit memorizes dynamically-loaded code information indicating a class structure of a dynamically-loaded code and call method information in which tag information added to user information is associated with a class structure of a code performed for the user information, for each of the dynamically-loaded codes acquired via a network. The extraction unit detects transmission of user information to another device and specifies tag information that matches the tag information added to the user information from the
(Continued)

call method information memorized in the memory unit, to extract a class structure associated with the tag information. The specification unit searches the memory unit for dynamically-loaded code information indicating the class structure, to specify a dynamically-loaded code corresponding to the dynamically-loaded code information.

8 Claims, 8 Drawing Sheets

(58) Field of Classification Search
USPC .................................................. 726/22–25
See application file for complete search history.

(56) References Cited

U.S. PATENT DOCUMENTS

| | | |
|---|---|---|
| 2013/0139262 A1 | 5/2013 | Glew et al. |
| 2014/0020094 A1 | 1/2014 | Wang et al. |
| 2016/0277441 A1 | 9/2016 | Glew et al. |

OTHER PUBLICATIONS

Takaaki Nagumo, et al., "Analyzing Dynamic Class Loaded Applications in Android", The Institute of Electronics, Information and Communication Engineers, IEICE Technical Report, vol. 114, No. 70, 2014, Total 9 Pages.

Sebastian Poeplau, et al., "Execute This! Analyzing Unsafe and Malicious Dynamic Code Loading in Android Applications", Proceedings of Annual Network & Distributed System Security Symposium (NDSS), Feb. 23-26, 2014, Total 16 Pages.

"Androguard" [online] https://code.google.com/p/androguard, May 19, 2014 (retrieval date), Total 5 Pages.

William Enck, et al., "TaintDroid: An Information-Flow Tracking System for Realtime Privacy Monitoring on Smartphones", to Appear at the $9^{th}$ USENIX Symposium on Operating Systems Design and Implementation (OSDI'10), 2010, Total 15 Pages.

International Search Report dated Aug. 4, 2015 in PCT/JP15/064178 Filed May 18, 2015.

Office Action dated Sep. 29, 2018 in Chinese Application No. 201580027969.0 (w/English translation).

\* cited by examiner

| TAINT TAG ID | TAINT SOURCE | ADDRESS | USER-INFORMATION DETERMINATION INFORMATION |
|---|---|---|---|
| TAG A | XX | 1000-1100 | 1 |
| TAG B | YY | 2000-2100 | 1 |
| TAG C | ABC | 3000-3100 | 0 |

DYNAMICALLY-LOADED CODE ANALYSIS DEVICE, DYNAMICALLY-LOADED CODE ANALYSIS METHOD, AND DYNAMICALLY-LOADED CODE ANALYSIS PROGRAM

FIELD

The present invention relates to a dynamically-loaded code analysis device, a dynamically-loaded code analysis method, and a dynamically-loaded code analysis program.

BACKGROUND

At present, for example, in an application for a mobile terminal such as Android®, highly convenient services have been provided by using user information including address book data, position information, call history, browser access history, and the like accumulated in the mobile terminal.

Meanwhile, there are many cases where, with respect to a code at the time of installation of the application (an original code), a code dynamically loaded after installation (hereinafter, "dynamically-loaded code") acquires user information unnecessary for the service and transmits the information to outside.

Furthermore, a dynamic method and a static method have been known as an application analysis method. For example, according to the dynamic method, tag information referred to as "taint tag" is added to user information in a mobile terminal with respect to an application that transmits general user information, and the tag information is analyzed at the time of network transmission and writing to files. On the other hand, according to the static method, the application itself is analyzed without operating the application to analyze the data flow.

CITATION LIST

Non Patent Literatures

Non Patent Literature 1: Sebastian Poeplau et al., "Execute This! Analyzing Unsafe and Malicious Dynamic Code Loading in Android Applications", Proceedings of Annual Network & Distributed System Security Symposium (NDSS), 2014.

Non Patent Literature 2: "androguard", [online], [searched on May 19, 2014], Internet <https://code.google.com/p/androguard/>

Non Patent Literature 3: William Enck et al., "TaintDroid: An Information-Flow Tracking System for Realtime Privacy Monitoring on Smartphones", Proceedings of the 9th USENIX Symposium on Operating Systems Design and Implementation (OSDI), 2010.

SUMMARY

Technical Problem

However, according to the conventional techniques described above, there is a problem that a dynamically-loaded code that has caused transmission of user information cannot be specified with respect to a large amount of applications cyclopaedically and without erroneous detection. "Erroneous detection" referred to herein means that motion that cannot arise at the time of an application operation is detected.

For example, in the static method, because the application is not operated, the dynamically-loaded code cannot be acquired in the first place. Further, in the dynamic method, user information transmitted to outside can be detected by analyzing the taint tag. However, the original code and the dynamically-loaded code cannot be discriminated from each other and analyzed. Therefore, in the dynamic method, it cannot be specified which code has caused transmission of user information.

The technique disclosed herein has been achieved in view of the above problems, and an object thereof is to specify a dynamically-loaded code that has caused transmission of user information with respect to a large amount of applications cyclopaedically and without erroneous detection.

Solution to Problem

A dynamically-loaded code analysis device includes: a memory unit that memorizes dynamically-loaded code information indicating a class structure of a dynamically-loaded code and call method information in which tag information added to user information is associated with a class structure of a code performed for the user information, for each of the dynamically-loaded codes acquired via a network; an extraction unit that detects transmission of user information to another device and specifies tag information that matches tag information added to the detected user information from the call method information memorized in the memory unit, to extract a class structure associated with the specified tag information; and a specification unit that searches the memory unit for dynamically-loaded code information indicating the extracted class structure, to specify a dynamically-loaded code corresponding to the searched dynamically-loaded code information.

Advantageous Effects of Invention

According to one aspect of the dynamically-loaded code analysis device, the dynamically-loaded code analysis method, and the dynamically-loaded code analysis program disclosed herein, a dynamically-loaded code that has caused transmission of user information can be specified with respect to a large amount of applications cyclopaedically and without erroneous detection.

DESCRIPTION OF EMBODIMENTS

Embodiments of a dynamically-loaded code analysis device, a dynamically-loaded code analysis method, and a dynamically-loaded code analysis program disclosed herein will be explained below in detail with reference to the accompanying drawings. The present invention is not limited to the embodiments.

(First Embodiment)

Figure 1:
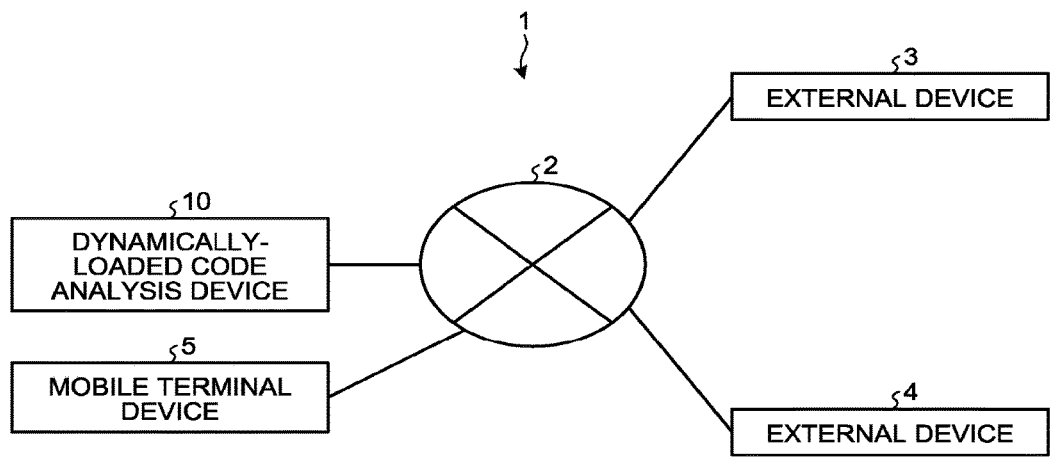
FIG. 1 is a diagram illustrating a configuration example of a dynamically-loaded code analysis system according to a first embodiment.

FIG. 1 is a diagram illustrating a configuration example of a dynamically-loaded code analysis system 1 according to a first embodiment. As illustrated in FIG. 1, in the dynamically-loaded code analysis system 1 according to the first embodiment, a dynamically-loaded code analysis device 10, an external device 3, an external device 4, and a mobile terminal device 5 are connected to each other via a network 2 such as a LAN (Local Area Network). The configuration of the dynamically-loaded code analysis system 1 is not limited to the example illustrated in FIG. 1. For example, in the example illustrated in FIG. 1, a case where there are two external devices and one mobile terminal device is illustrated. However, the number of external devices and mobile terminal devices is not limited to the number illustrated in FIG. 1.

The external device 3 manages a dynamically-loaded code. The "dynamically-loaded code" referred to herein indicates a code to be incorporated in an application after an application has been installed in the terminal. In other words, the "dynamically-loaded code" is a code to be loaded dynamically after installation of an application with respect to a code at the time of installation of the application (hereinafter, "original code"). The "dynamically-loaded code" may include a code added with a function of transmitting user information exceeding the application privacy policy. The "user information" referred to herein indicates information by which an individual can be specified by anyone else and information not desired to be known to anyone else, which is stored in a smartphone terminal including the Android®. For example, the user information includes address, phone number, name, contractor ID (Identifier), password, card number, position information, and call history.

The external device 3 distributes the dynamically-loaded code to the mobile terminal device 5 and the dynamically-loaded code analysis device 10 upon reception of an acquisition request from the mobile terminal device 5 and the dynamically-loaded code analysis device 10. The mobile terminal device 5 and the dynamically-loaded code analysis device 10 request acquisition of the dynamically-loaded code to the external device 3, intentionally or unintentionally.

The external device 4 collects pieces of user information. For example, the external device 4 collects user information from the mobile terminal device 5 that has acquired the dynamically-loaded code.

The mobile terminal device 5 is a smartphone or a tablet terminal, for example. User information of a user of the mobile terminal device 5 is stored in the mobile terminal device 5. The mobile terminal device 5 accesses an application management device (not illustrated) that distributes applications to acquire an application, according to an operation of the user.

When the original code of the application acquired by the mobile terminal device 5 uses the dynamically-loaded code intended for, for example, advertising revenue, the user information may be transmitted to the external device 4 while exceeding the application privacy policy. When reading a code acquired from the network 2, the dynamically-loaded code to be read may be dynamically changed. Therefore, even if the same original code is performed, the motion of the application changes depending on the dynamically-loaded code. In such a case, the user information may be transmitted to, for example, the external device 4 while exceeding the application privacy policy.

Therefore, the dynamically-loaded code analysis device 10 according to the first embodiment analyzes whether to transmit the user information independently regarding the dynamically-loaded code. For example, the dynamically-loaded code analysis device 10 constructs a protected area such as a sandbox, and analyzes the dynamically-loaded code in the protected area, so that the system of the dynamically-loaded code analysis device 10 is not affected.

Figure 2:
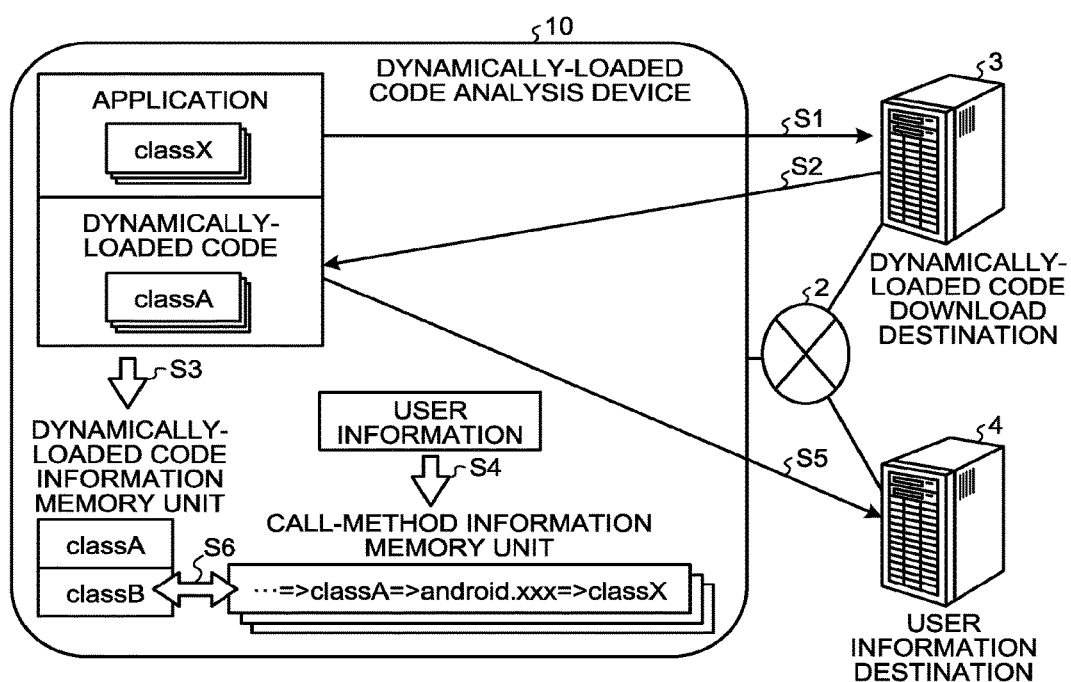
FIG. 2 is an explanatory diagram of a processing operation performed by a dynamically-loaded code analysis device according to the first embodiment.

FIG. 2 is an explanatory diagram of a processing operation performed by the dynamically-loaded code analysis device 10 according to the first embodiment. In the example illustrated in FIG. 2, a case where the dynamically-loaded code analysis device 10 specifies a dynamically-loaded code that has caused transmission of the user information from the dynamically-loaded codes acquired from the external device 3 is described.

As illustrated in FIG. 2, the dynamically-loaded code analysis device 10 requests acquisition of a dynamically-loaded code to the external device 3 (Step S1). The external device 3 transmits a dynamically-loaded code to the dynamically-loaded code analysis device 10 (Step S2).

The dynamically-loaded code analysis device 10 analyzes the acquired dynamically-loaded code (Step S3). The dynamically-loaded code analysis device 10 memorizes an analysis result of the dynamically-loaded code as dynamically-loaded code information in a dynamically-loaded code information memory unit.

The dynamically-loaded code analysis device 10 causes the acquired application to work, thereby performing dynamic analysis for analyzing the flow of the user information (Step S4). For example, the dynamically-loaded code analysis device 10 performs taint analysis as the dynamic analysis. More specifically, after adding tag information to the user information, the dynamically-loaded code analysis device 10 executes the application, and performs method trace each time the user information is operated. The dynamically-loaded code analysis device 10 memorizes the result of method trace as call method information in a call-method information memory unit.

If the dynamically-loaded code analysis device 10 detects the tag information of information to be transmitted to outside (Step S5), the dynamically-loaded code analysis device 10 collates the dynamically-loaded code information and the call method information to specify a dynamically-loaded code that has caused transmission of the user information (Step S6).

Figures 3, 4:
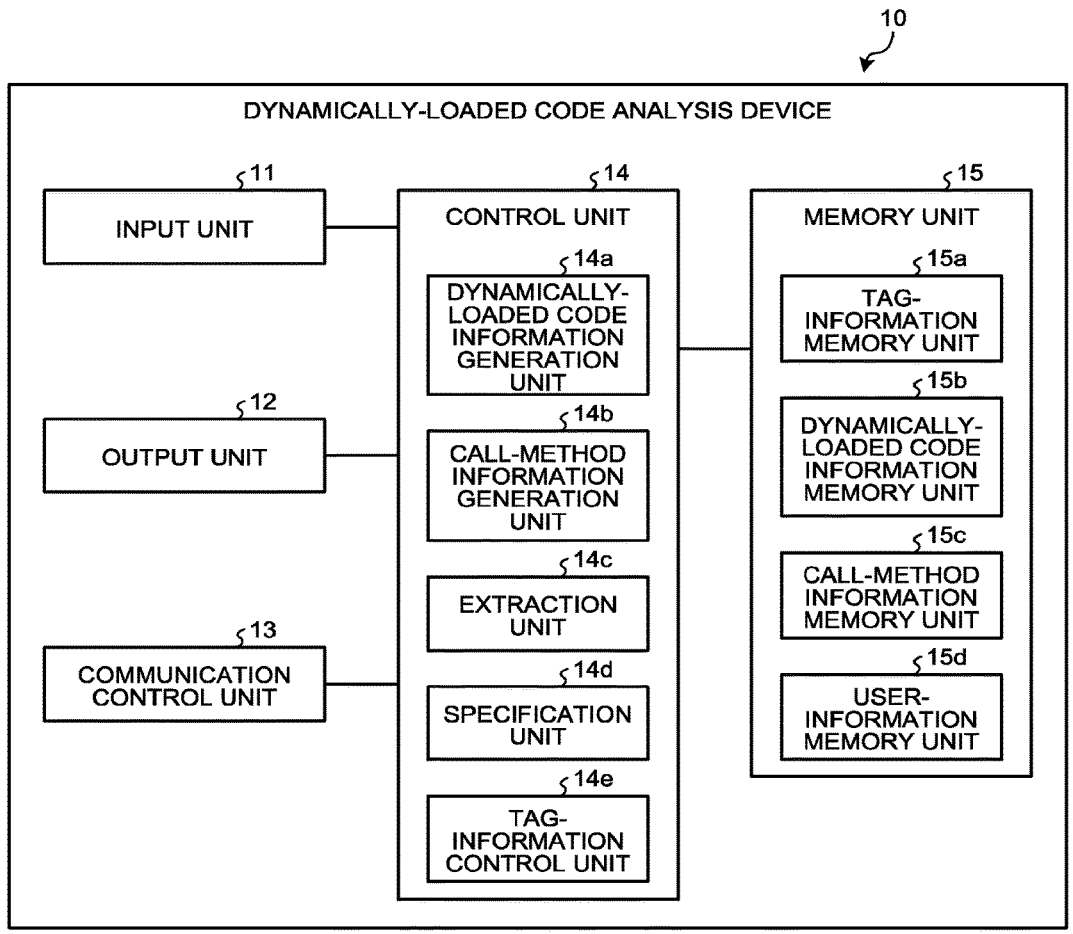
FIG. 3 is a diagram illustrating a configuration example of the dynamically-loaded code analysis device according to the first embodiment.
FIG. 4 is a diagram illustrating an example of a data structure to be memorized in a tag-information memory unit according to the first embodiment.

The configuration of the dynamically-loaded code analysis device 10 illustrated in FIG. 1 is described next with reference to FIG. 3. FIG. 3 is a diagram illustrating a configuration example of the dynamically-loaded code analysis device 10 according to the first embodiment. As illustrated in FIG. 3, the dynamically-loaded code analysis device 10 includes an input unit 11, an output unit 12, a communication control unit 13, a control unit 14, and a memory unit 15.

The input unit 11 accepts various operations from an operator of the dynamically-loaded code analysis device 10. The output unit 12 is, for example, a liquid crystal display and outputs various pieces of information. The communication control unit 13 controls communication related to the various pieces of information exchanged between the dynamically-loaded code analysis device 10 and other devices connected thereto via the network 2. For example, the communication control unit 13 requests acquisition of a dynamically-loaded code to the external device 3, and receives the dynamically-loaded code from the external device 3.

The memory unit 15 is, for example, a semiconductor memory element such as a RAM (Random Access Memory) or a flash memory, or a memory device such as a hard disk or an optical disk. For example, as illustrated in FIG. 3, the memory unit 15 includes a tag-information memory unit 15a, a dynamically-loaded code information memory unit 15b, a call-method information memory unit 15c, and a user-information memory unit 15d.

The user-information memory unit 15d memorizes user information therein. The user information indicates information by which an individual can be specified by anyone else and information not desired to be known to anyone else, which is stored in a smartphone terminal including the Android®. For example, the user information includes address, phone number, name, contractor ID, password, card number, position information, and call history. The user information can include identification number of user terminal, SIM (Subscriber Identity Module) identification number, OS (Operating System) generation identification number, camera image, SMS (Short Message Service) information, and bookmark information. The user information to be memorized in the dynamically-loaded code analysis device 10 may not be actually present user information but can be dummy data.

The tag-information memory unit 15a memorizes the tag information indicating a taint tag added to information desired to be tracked. FIG. 4 is a diagram illustrating an example of a data structure to be memorized in the tag-information memory unit 15a according to the first embodiment. For example, as illustrated in FIG. 4, the tag-information memory unit 15a memorizes information in which "taint tag ID", "taint source", "address", and "user-information determination information" are associated with each other.

The "taint tag ID" to be memorized in the tag-information memory unit 15a indicates an identifier of the taint tag. For example, "tag A", "tag B", and the like are stored in the "taint tag ID". The "taint source" to be memorized in the tag-information memory unit 15a indicates an object added with taint. In other words, the taint source is information desired to be traced, and includes user information. For example, "XX", "YY", "ABC", and the like are stored in the "taint source". It is assumed here that "XX" and "YY" are user information, and "ABC" is information other than the user information.

The "address" to be memorized in the tag-information memory unit 15a indicates a memory position where the taint source is stored in a memory area. For example, "1000-1100", "2000-2100", and the like are stored in the "address". The value stored in the "address" is updated according to a change of the memory position where the taint source is stored. The "user-information determination information" to be memorized in the tag-information memory unit 15a indicates whether the taint source is user information. For example, "1" indicating that the taint source is user information and "0" indicating that the taint source is not user information are stored in the "user-information determination information".

As an example, the tag-information memory unit 15a illustrated in FIG. 4 indicates that the taint tag added to the taint source "XX" that is the user information is "tag A", and that the taint source "XX" is stored in the address "1000-1100". The tag-information memory unit 15a illustrated in FIG. 4 indicates that the taint tag added to the taint source "YY" that is the user information is "tag B", and that the taint source "YY" is stored in the address "2000-2100". Further, the tag-information memory unit 15a illustrated in FIG. 4 indicates that the taint tag added to the taint source "ABC" that is not the user information is "tag C", and that the taint source "ABC" is stored in the address "3000-3100".

Figure 5:
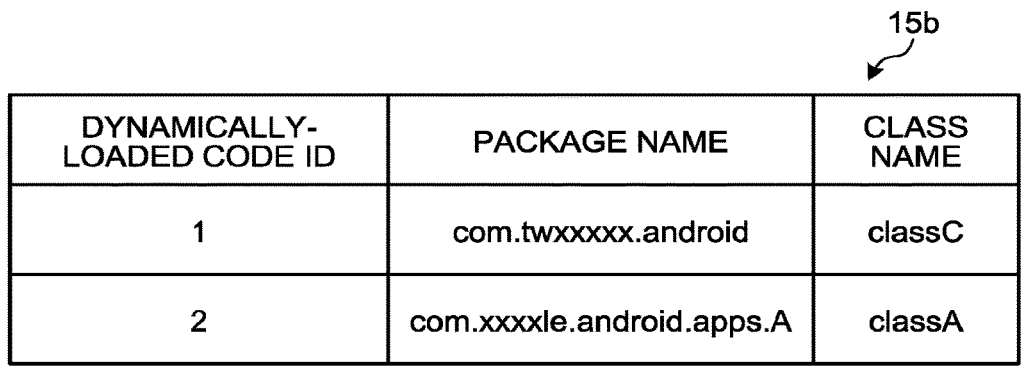
FIG. 5 is a diagram illustrating an example of a data structure to be memorized in a dynamically-loaded code information memory unit according to the first embodiment.

The dynamically-loaded code information memory unit 15b memorizes the dynamically-loaded code information indicating a class structure of the dynamically-loaded code for each of the dynamically-loaded codes acquired via the network. FIG. 5 is a diagram illustrating an example of a data structure to be memorized by the dynamically-loaded code information memory unit 15b according to the first embodiment. For example, as illustrated in FIG. 5, the dynamically-loaded code information memory unit 15b memorizes information in which "dynamically-loaded code ID", "package name", and "class name" are associated with each other. The "package name" and the "class name" to be memorized in the dynamically-loaded code information memory unit 15b are also referred to as "analysis information".

The "dynamically-loaded code ID" to be memorized in the dynamically-loaded code information memory unit 15b indicates an identifier of the dynamically-loaded code. For example, "1", "2", and the like are stored in the "dynamically-loaded code ID".

The "package name" to be memorized in the dynamically-loaded code information memory unit 15b indicates a package name as the class structure of the dynamically-loaded code. For example, "com.twxxxxxx.android", "com.xxxxle.android.apps.A", and the like are stored in the "package name".

The "class name" to be memorized in the dynamically-loaded code information memory unit 15b indicates class name as the class structure of the dynamically-loaded code. For example, "classC", "classA", and the like are stored in the "class name".

As an example, the dynamically-loaded code information memory unit 15b illustrated in FIG. 5 indicates that the class structure of the dynamically-loaded code with the dynamically-loaded code ID being "1" is "com.twxxxxxx.android" and "classC". Further, the dynamically-loaded code information memory unit 15b illustrated in FIG. 5 indicates that the class structure of the dynamically-loaded code with the dynamically-loaded code ID being "2" is "com.xxxxle.android.apps.A" and "classA".

Figure 6:
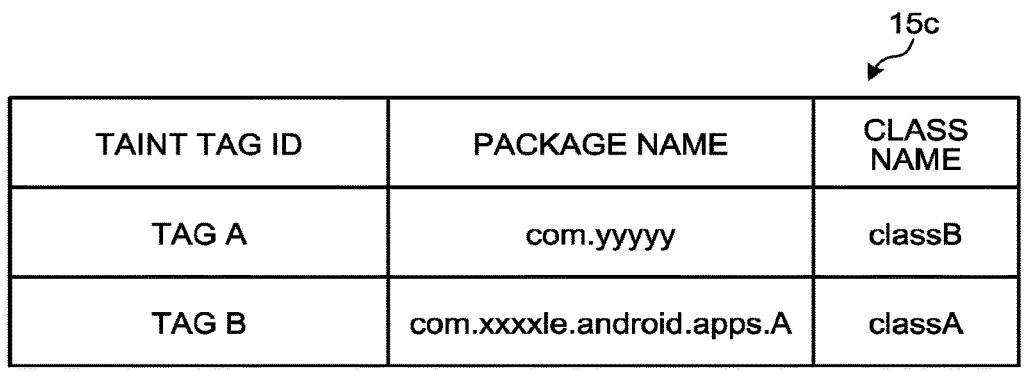
FIG. 6 is a diagram illustrating an example of a data structure to be memorized in a call-method information memory unit according to the first embodiment.

The call-method information memory unit 15c memorizes call method information in which the tag information added to the user information and the class structure of the code performed for the user information are associated with each other. FIG. 6 is a diagram illustrating an example of the data structure to be memorized in the call-method information memory unit 15c according to the first embodiment. For example, as illustrated in FIG. 6, the call-method information memory unit 15c memorizes information in which "taint tag ID", "package name", and "class name" are associated with each other. The "package name" and the "class name" to be memorized in the call-method information memory unit 15c are also referred to as "trace information".

The "taint tag ID" to be memorized in the call-method information memory unit 15c indicates an identifier of the taint tag. For example, "tag A", "tag B", and the like are stored in the "taint tag ID".

The "package name" to be memorized in the call-method information memory unit 15c indicates the package name as the class structure of the code performed when the taint tag propagates. For example, "com.yyyyy", "com.xxxxle.android.apps.A", and the like are stored in the "package name".

The "class name" to be memorized in the call-method information memory unit 15c indicates the class name as the class structure of the code performed when the taint tag propagates. For example, "classB", "classA", and the like are stored in the "class name".

As an example, the call-method information memory unit 15c illustrated in FIG. 6 indicates that the class structure of the code performed when the taint tag with the taint tag ID being "tag A" propagates is "com.yyyyy" and "classB". Further, the call-method information memory unit 15c illustrated in FIG. 6 indicates that the class structure of the code performed when the taint tag with the taint tag ID being "tag B" propagates is "com.xxxxle.android.apps.A" and "classA".

Referring back to FIG. 3, the control unit 14 is an electronic circuit such as a CPU (Central Processing Unit) or an MPU (Micro Processing Unit), or an integrated circuit such as an ASIC (Application Specific Integrated Circuit) or an FPGA (Field Programmable Gate Array). The control unit 14 includes a dynamically-loaded code information generation unit 14a, a call-method information generation unit 14b, an extraction unit 14c, a specification unit 14d, and a tag-information control unit 14e.

Figure 7:
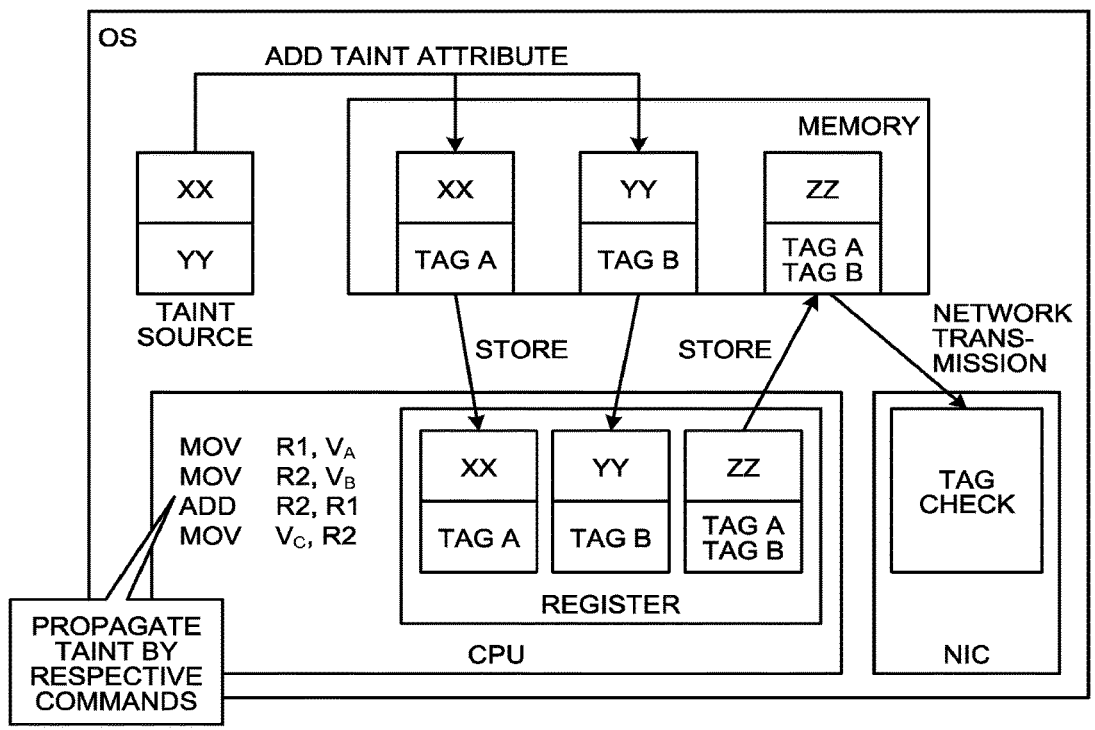
FIG. 7 is an explanatory diagram of a processing operation of a tag-information control unit according to the first embodiment.

The tag-information control unit 14e performs taint analysis as the dynamic analysis. FIG. 7 is an explanatory diagram of a processing operation of the tag-information control unit 14e according to the first embodiment. As illustrated in FIG. 7, the tag-information control unit 14e adds the tag A to the information XX that is user information as the taint source, adds the tag B to the information YY that is user information as the taint source, and stores the respective pieces of information in a register in the CPU. When the information XX and the information YY are combined to become information ZZ by executing the application, the tag-information control unit 14e processes attribute A and attribute B according to a propagation rule. That is, the tag-information control unit 14e combines the attribute A and the attribute B, and the tag information of the information ZZ becomes "attribute A, attribute B". In this manner, the tag-information control unit 14e propagates the taint tag when arithmetic processing with respect to the user information is performed.

The extraction unit 14c described later detects that the information ZZ has been transmitted via the network. In such a case, the extraction unit 14c analyzes the tag information "attribute A, attribute B" of the information ZZ to determine whether the transmitted information is user information.

The dynamically-loaded code information generation unit 14a generates dynamically-loaded code information. For example, the dynamically-loaded code information generation unit 14a monitors the class that uses the dynamically-loaded code by using a DexClass Loader or the like, and when the class is used, the dynamically-loaded code information generation unit 14a detects the dynamically-loaded code.

Next, the dynamically-loaded code information generation unit 14a analyzes a dynamically-loaded code acquired via the network to generate dynamically-loaded code information, and stores the dynamically-loaded code information in the memory unit 15. Because the dynamically-loaded code is in a DEX (Dalvik EXecutable) file format similarly to an internal code, the dynamically-loaded code information generation unit 14a specifies the "package name" and the "class name" by reverse engineering analysis of the DEX file.

The dynamically-loaded code information generation unit 14a then generates dynamically-loaded code information in which the specified "package name" and "class name" are associated with the "dynamically-loaded code ID" of the detected dynamically-loaded code, and stores the dynamically-loaded code information in the dynamically-loaded code information memory unit 15b.

When the arithmetic processing has been performed with respect to the user information, the call-method information generation unit 14b generates call method information by analyzing the code performed in the arithmetic processing, and stores the generated call method information in the memory unit 15. For example, when the tag-information control unit 14e performs the arithmetic processing with respect to the user information, the call-method information generation unit 14b performs method trace. In other words, the call-method information generation unit 14b outputs the call method based on the taint analysis as a trigger.

The call-method information generation unit 14b generates the call method information in which at least the "package name" and the "class name" of the output call method are associated with the "taint tag ID" of the taint tag for which the arithmetic processing has been performed, and stores the call method information in the call-method information memory unit 15c.

The extraction unit 14c detects transmission of the user information to another device, and specifies tag information that matches the tag information added to the detected user information from the call method information memorized in the memory unit 15, to extract a class structure associated with the specified tag information. Detailed processing of the extraction unit 14c is described later with reference to FIG. 8.

The specification unit 14d searches the memory unit 15 for the dynamically-loaded code information indicating the class structure extracted by the extraction unit 14c, to specify a dynamically-loaded code corresponding to the searched dynamically-loaded code information. For example, upon detection of transmission of the user information, the specification unit 14d searches the memory unit 15 for the dynamically-loaded code information indicating the extracted class structure, and specifies a dynamically-loaded code corresponding to the searched dynamically-loaded code information. More specifically, the specification unit 14*d* specifies a dynamically-loaded code including a package name and a class name that matches the package name and the class name of the code performed with regard to the user information based on the pieces of information memorized in the dynamically-loaded code information memory unit 15*b*. Detailed processing performed by the specification unit 14*d* is described later with reference to FIG. 8.

Figure 8:
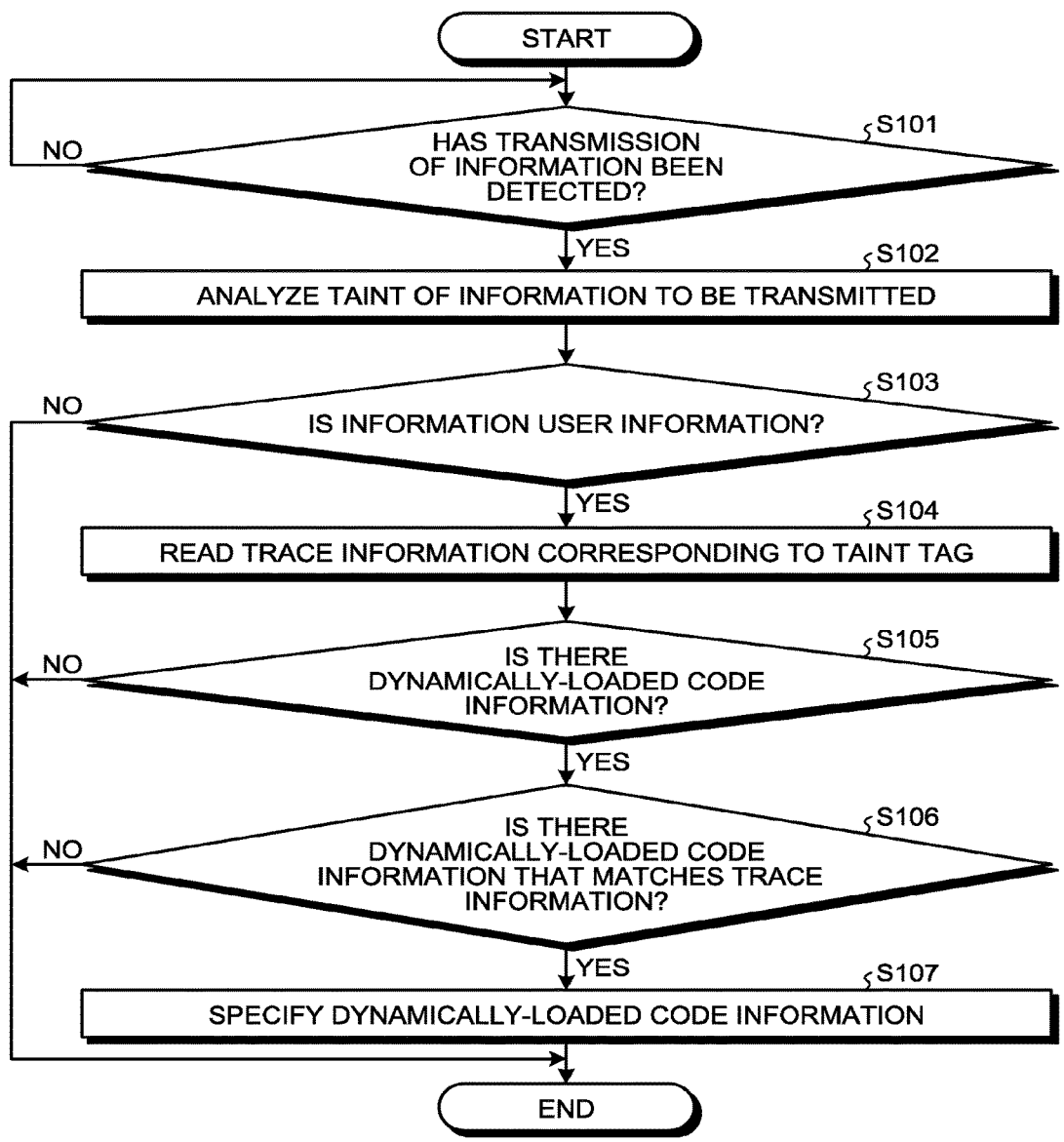
FIG. 8 is a flowchart illustrating a process procedure performed by the dynamically-loaded code analysis device according to the first embodiment.

Collating process performed by the dynamically-loaded code analysis device 10 according to the first embodiment is described next with reference to FIG. 8. FIG. 8 is a flowchart illustrating a process procedure performed by the dynamically-loaded code analysis device 10 according to the first embodiment.

As illustrated in FIG. 8, the extraction unit 14*c* of the dynamically-loaded code analysis device 10 determines whether transmission of information has been detected (Step S101). For example, if the API of network communication is called, the extraction unit 14*c* determines that transmission of information has been detected. If the extraction unit 14*c* determines that transmission of information has not been detected (NO at Step S101), the extraction unit 14*c* repeatedly determines whether transmission of information has been detected.

If determining that transmission of information has been detected (YES at Step S101), the extraction unit 14*c* analyzes taint of information to be transmitted (Step S102). For example, the extraction unit 14*c* reads a taint tag added to the information to be transmitted. The extraction unit 14*c* specifies a taint tag that matches the read taint tag based on the pieces of information memorized in the tag-information memory unit 15*a*, and reads a value to be stored in the "user-information determination information" associated with the specified taint tag.

Next, the extraction unit 14*c* determines whether the information is user information (Step S103). For example, the extraction unit 14*c* refers to the "user-information determination information" in the tag-information memory unit 15*a*. If the stored value is "1", the extraction unit 14*c* determines that the information to be transmitted is user information, and if the stored value is "0", the extraction unit 14*c* determines that the information to be transmitted is not user information. If the taint tag is not added to the information to be transmitted, the extraction unit 14*c* determines that the information to be transmitted is not user information. If the extraction unit 14*c* determines that the information to be transmitted is not user information (NO at Step S103), the extraction unit 14*c* finishes the process.

If determining that the information to be transmitted is user information (YES at Step S103), the extraction unit 14*c* reads the trace information corresponding to the taint tag (Step S104). For example, the extraction unit 14*c* specifies a taint tag that matches the read taint tag based on the pieces of information memorized in the call-method information memory unit 15*c*, and reads a value to be stored in the "package name" and the "class name" associated with the specified taint tag. For example, when the taint tag added to the user information is "tag B" illustrated in FIG. 6, the extraction unit 14*c* extracts "com.xxxxle.android.apps.A" and "classA" as the trace information. When the taint tag added to the user information is "tag A" illustrated in FIG. 6, the extraction unit 14*c* extracts "com.yyyyy" and "classB" as the trace information.

The specification unit 14*d* determines whether there is dynamically-loaded code information (Step S105). For example, the specification unit 14*d* searches the dynamically-loaded code information memory unit 15*b* to determine whether there is the dynamically-loaded code information. If the specification unit 14*d* determines that there is no dynamically-loaded code information (NO at Step S105), the specification unit 14*d* determines that transmission of the user information by the dynamically-loaded code does not occur, and finishes the process.

On the other hand, if determining that there is the dynamically-loaded code information (YES at Step S105), the specification unit 14*d* determines whether there is dynamically-loaded code information that matches the trace information (Step S106). For example, a case where the taint tag added to the user information is "tag B" illustrated in FIG. 6 is described. In such a case, the specification unit 14*d* searches the dynamically-loaded code information memory unit 15*b* for dynamically-loaded code information that matches "com.xxxxle.android.apps.A" and "classA" as the trace information, and specifies the dynamically-loaded code information with the dynamically-loaded code ID being "2". On the other hand, a case where the taint tag added to the user information is "tag A" illustrated in FIG. 6 is described. In this case, the specification unit 14*d* searches the dynamically-loaded code information memory unit 15*b* for dynamically-loaded code information that matches "com.yyyyy" and "classB" as the trace information. However, the specification unit 14*d* determines that there is no matched dynamically-loaded code.

If determining that there is the dynamically-loaded code information that matches the trace information (YES at Step S106), the specification unit 14*d* specifies the matched dynamically-loaded code information as the dynamically-loaded code that has caused transmission of the user information (Step S107). If the specification unit 14*d* determines that there is no dynamically-loaded code information that matches the trace information (NO at Step S106), the specification unit 14*d* finishes the process.

Figure 9:
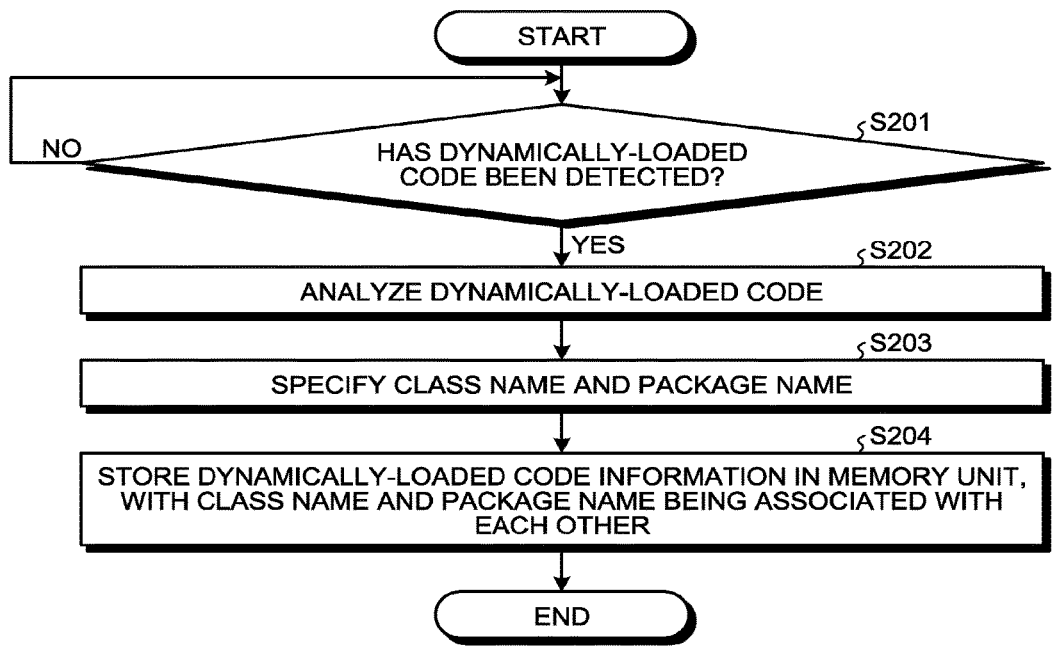
FIG. 9 is a flowchart illustrating a process procedure performed by a dynamically-loaded code information generation unit according to the first embodiment.

A dynamically-loaded code information generation process performed by the dynamically-loaded code information generation unit 14*a* according to the first embodiment is described next with reference to FIG. 9. FIG. 9 is a flowchart illustrating a process procedure performed by the dynamically-loaded code information generation unit 14*a* according to the first embodiment.

As illustrated in FIG. 9, the dynamically-loaded code information generation unit 14*a* determines whether a dynamically-loaded code has been detected (Step S201). For example, when a class using the dynamically-loaded code is used by a DexClassLoader or the like, the dynamically-loaded code information generation unit 14*a* detects a dynamically-loaded code. If the dynamically-loaded code information generation unit 14*a* determines that the dynamically-loaded code has not been detected (NO at Step S201), the dynamically-loaded code information generation unit 14*a* repeatedly determines whether a dynamically-loaded code has been detected.

On the other hand, if determining that a dynamically-loaded code has been detected (YES at Step S201), the dynamically-loaded code information generation unit 14*a* analyzes the detected dynamically-loaded code (Step S202). The dynamically-loaded code information generation unit 14*a* specifies the "package name" and the "class name" by the reverse engineering analysis of the DEX file (Step S203).

Next, the dynamically-loaded code information generation unit 14*a* adds the "dynamically-loaded code ID" to the detected dynamically-loaded code to generate the dynamically-loaded code information in which the added "dynamically-loaded code ID" is associated with the specified "package name" and "class name", and stores the dynamically-loaded code information in the dynamically-loaded code information memory unit 15b (Step S204).

Figure 10:
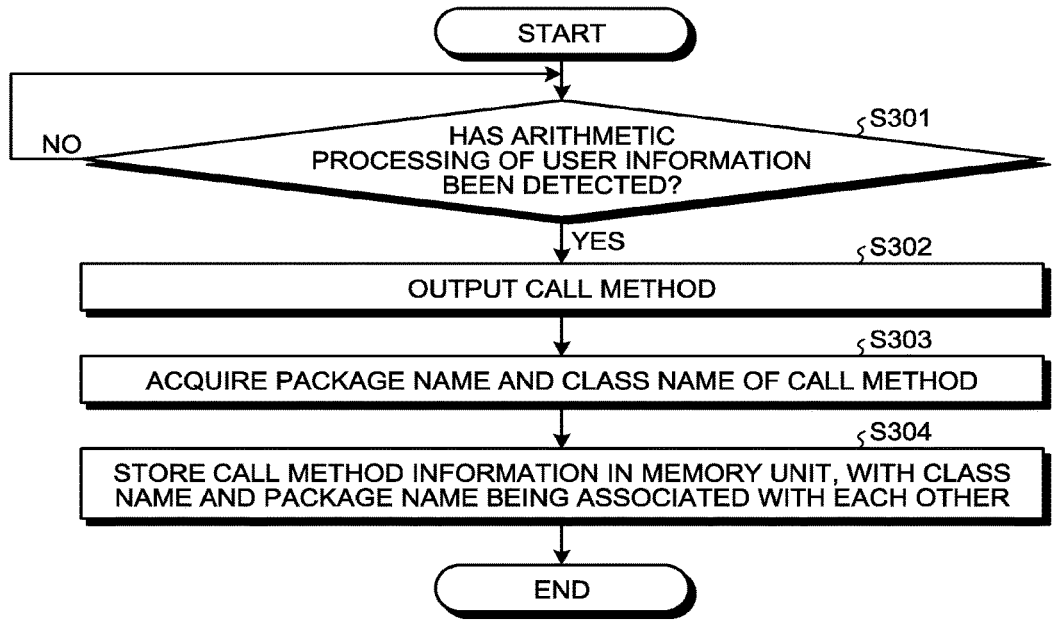
FIG. 10 is a flowchart illustrating a process procedure performed by a call-method information generation unit according to the first embodiment.

A call-method information generation process performed by the call-method information generation unit 14b according to the first embodiment is described next with reference to FIG. 10. FIG. 10 is a flowchart illustrating a process procedure performed by the call-method information generation unit 14b according to the first embodiment.

As illustrated in FIG. 10, the call-method information generation unit 14b determines whether the arithmetic processing of the user information has been detected (Step S301). If the call-method information generation unit 14b determines that the arithmetic processing of the user information has not been detected (NO at Step S301), the call-method information generation unit 14b repeatedly determines whether the arithmetic processing of the user information has been detected.

On the other hand, if determining that the arithmetic processing of the user information has been detected (YES at Step S301), the call-method information generation unit 14b outputs the call method (Step S302). The call-method information generation unit 14b acquires at least the "package name" and the "class name" of the output call method (Step S303).

Next, the call-method information generation unit 14b generates call method information in which the acquired "package name" and "class name" are associated with the "taint tag ID" of the taint tag for which the arithmetic processing has been performed, and stores the call method information in the call-method information memory unit 15c (Step S304).

As described above, the dynamically-loaded code analysis device 10 according to the first embodiment analyzes the taint tag added to the user information to specify the class structure of the code that has transmitted the user information. The dynamically-loaded code analysis device 10 according to the first embodiment specifies the dynamically-loaded code that has caused transmission of the user information based on the class structure of the code. Upon detection of transmission of the user information, the dynamically-loaded code analysis device 10 according to the first embodiment specifies the dynamically-loaded code. Accordingly, the dynamically-loaded code analysis device 10 according to the first embodiment can specify the dynamically-loaded code that has caused transmission of the user information.

The dynamically-loaded code analysis device 10 according to the first embodiment specifies the dynamically-loaded code including a package name and a class name that matches the package name and the class name of the code performed with respect to the user information. Accordingly, the dynamically-loaded code analysis device 10 according to the first embodiment can specify the dynamically-loaded code that has caused transmission of the user information with respect to a large amount of applications cyclopaedically and without erroneous detection.

In the first embodiment described above, it has been described that the extraction unit 14c refers to the user-information determination information memorized in the tag-information memory unit 15a to determine whether the information to be transmitted is user information. However, the embodiment of the present invention is not limited thereto. For example, when the taint tag is added only to the user information, the extraction unit 14c does not need to determine whether the information to be transmitted is the user information.

(Second Embodiment)

In the first embodiment, it has been described that upon detection of transmission of the user information, the specification unit 14d specifies a dynamically-loaded code corresponding to the extracted trace information. However, the embodiment of the present invention is not limited thereto. For example, the specification unit 14d can specify the dynamically-loaded code by using the trace information extracted at a predetermined interval. In a second embodiment, a case where the trace information extracted by the extraction unit 14c is stored in the memory unit 15, and the specification unit 14d reads the trace information at a predetermined interval to specify the dynamically-loaded code is described.

Figure 11:
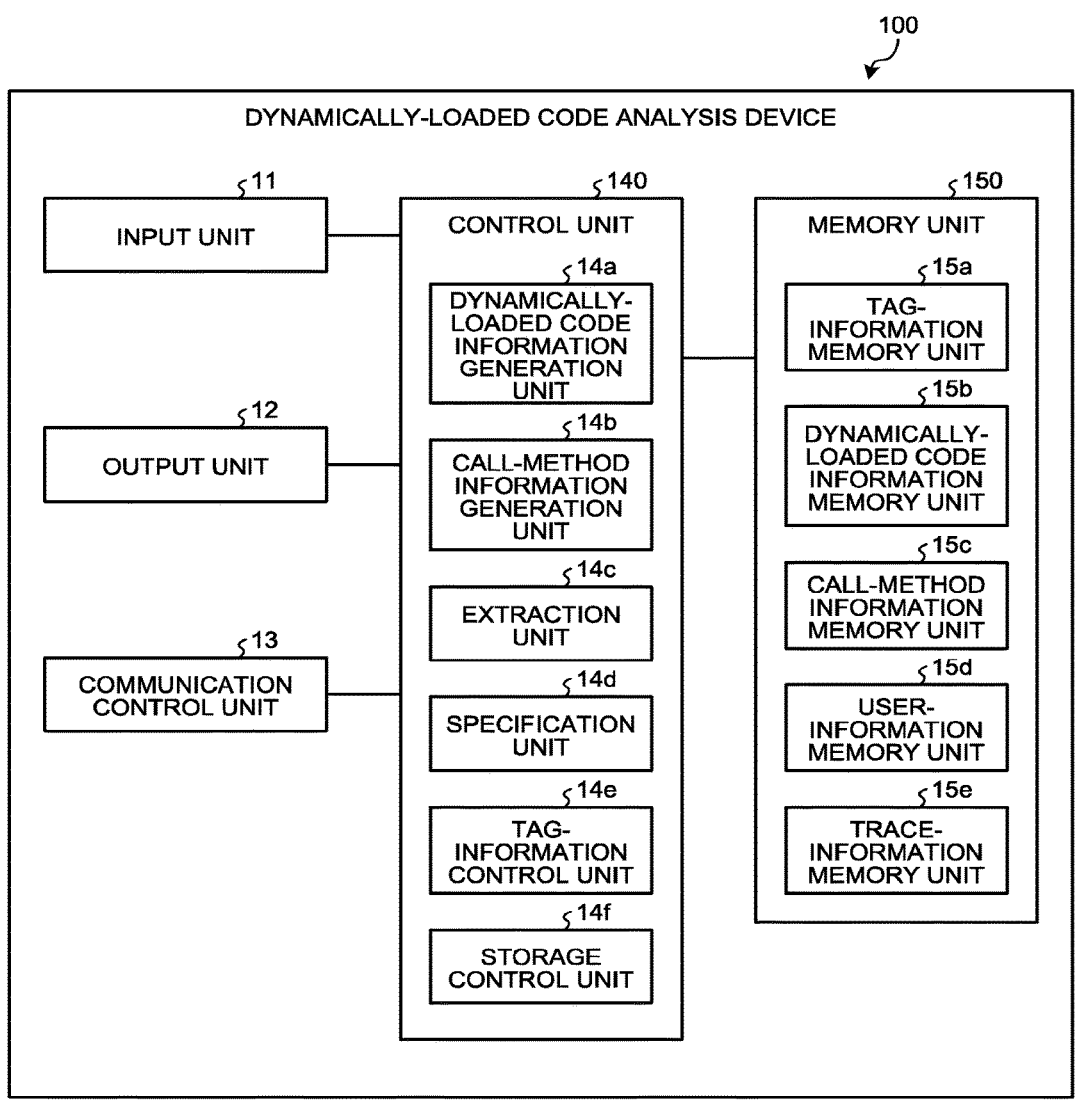
FIG. 11 is a diagram illustrating a configuration example of a dynamically-loaded code analysis device according to a second embodiment.

FIG. 11 is a diagram illustrating a configuration example of a dynamically-loaded code analysis device 100 according to the second embodiment. In FIG. 11, constituent elements identical to those of the dynamically-loaded code analysis device 10 according to the first embodiment illustrated in FIG. 3 are denoted by like reference signs and explanations thereof will be omitted.

As illustrated in FIG. 11, the dynamically-loaded code analysis device 100 includes the input unit 11, the output unit 12, the communication control unit 13, a control unit 140, and a memory unit 150. The memory unit 150 is, for example, a semiconductor memory element such as a RAM or a flash memory, or a memory device such as a hard disk or an optical disk.

For example, as illustrated in FIG. 11, the memory unit 150 includes the tag-information memory unit 15a, the dynamically-loaded code information memory unit 15b, the call-method information memory unit 15c, the user-information memory unit 15d, and a trace-information memory unit 15e. The trace-information memory unit 15e memorizes the trace information extracted by the extraction unit 14c.

The control unit 140 is an electronic circuit such as a CPU or an MPU, or an integrated circuit such as an ASIC or an FPGA. The control unit 140 includes the dynamically-loaded code information generation unit 14a, the call-method information generation unit 14b, the extraction unit 14c, the specification unit 14d, the tag-information control unit 14e, and a storage control unit 14f.

The storage control unit 14f stores the trace information extracted by the extraction unit 14c in the trace-information memory unit 15e. In other words, the storage control unit 14f stores the class structure extracted by the extraction unit 14c in the trace-information memory unit 15e. The specification unit 14d according to the second embodiment reads out the trace information from the trace-information memory unit 15e at a predetermined interval to specify the analysis information corresponding to the read trace information, and specifies the dynamically-loaded code associated with the analysis information. In other words, the specification unit 14d according to the second embodiment reads out the class structure extracted from the trace-information memory unit 15e at a predetermined interval, and searches the memory unit 15 for the dynamically-loaded code information indicating the read extracted class structure to specify the dynamically-loaded code corresponding to the searched dynamically-loaded code information.

As described above, the dynamically-loaded code analysis device 100 according to the second embodiment analyzes the taint tag added to the user information to specify the class structure of the code that has transmitted the user information. The dynamically-loaded code analysis device 100 according to the second embodiment specifies the dynamically-loaded code that has caused transmission of the user information based on the code class structure. The dynamically-loaded code analysis device 100 according to the second embodiment reads out the trace information from the trace-information memory unit 15*e* at a predetermined interval to specify the analysis information corresponding to the read trace information, and specifies the dynamically-loaded code associated with the analysis information. Accordingly, the dynamically-loaded code analysis device 100 according to the second embodiment can specify the dynamically-loaded code that has caused transmission of the user information with respect to a large amount of applications cyclopaedically and without erroneous detection.

(System Configuration and the Like)

Respective constituent elements of the respective devices illustrated in the drawings are functionally conceptual, and physically the same configuration is not always necessary. That is, the specific mode of distribution and integration of each device is not limited to the ones illustrated in the drawings, and all or a part thereof can be functionally or physically distributed or integrated in an optional unit according to various kinds of load and status of use. For example, the call-method information generation unit 14*b* and the tag-information control unit 14*e* can be integrated with each other. Further, all or an optional part of various processing functions performed by each device can be realized by a CPU or a program analyzed and executed by the CPU, or can be realized as hardware by a wired logic.

Among respective processes described in the present embodiments, all or a part of the processes described as being performed automatically can be performed manually, or all or a part of the processes described as those being performed manually can be performed automatically by a known method. In addition, information including process procedures, control procedures, specific names, and various kinds of data and parameters mentioned in the present specification and the drawings can be arbitrarily changed unless otherwise specified.

(Program)

A program in which processing performed by the dynamically-loaded code analysis device 10 described in the first embodiment is written in a computer executable language can be created. For example, a dynamically-loaded code analysis program in which the processing performed by the dynamically-loaded code analysis device 10 according to the first embodiment is written in a computer executable language can be created. In this case, the computer executes the dynamically-loaded code analysis program, thereby enabling to acquire the same effects as those of the first embodiment. The same processing as that of the first embodiment can be realized by recording the dynamically-loaded code analysis program in a computer readable recording medium and reading and executing the dynamically-loaded code analysis program recorded in the recording medium by a computer. An example of the computer that executes the dynamically-loaded code analysis program that realizes the same functions as those of the dynamically-loaded code analysis device 10 illustrated in FIG. 3 is described below.

Figure 12:
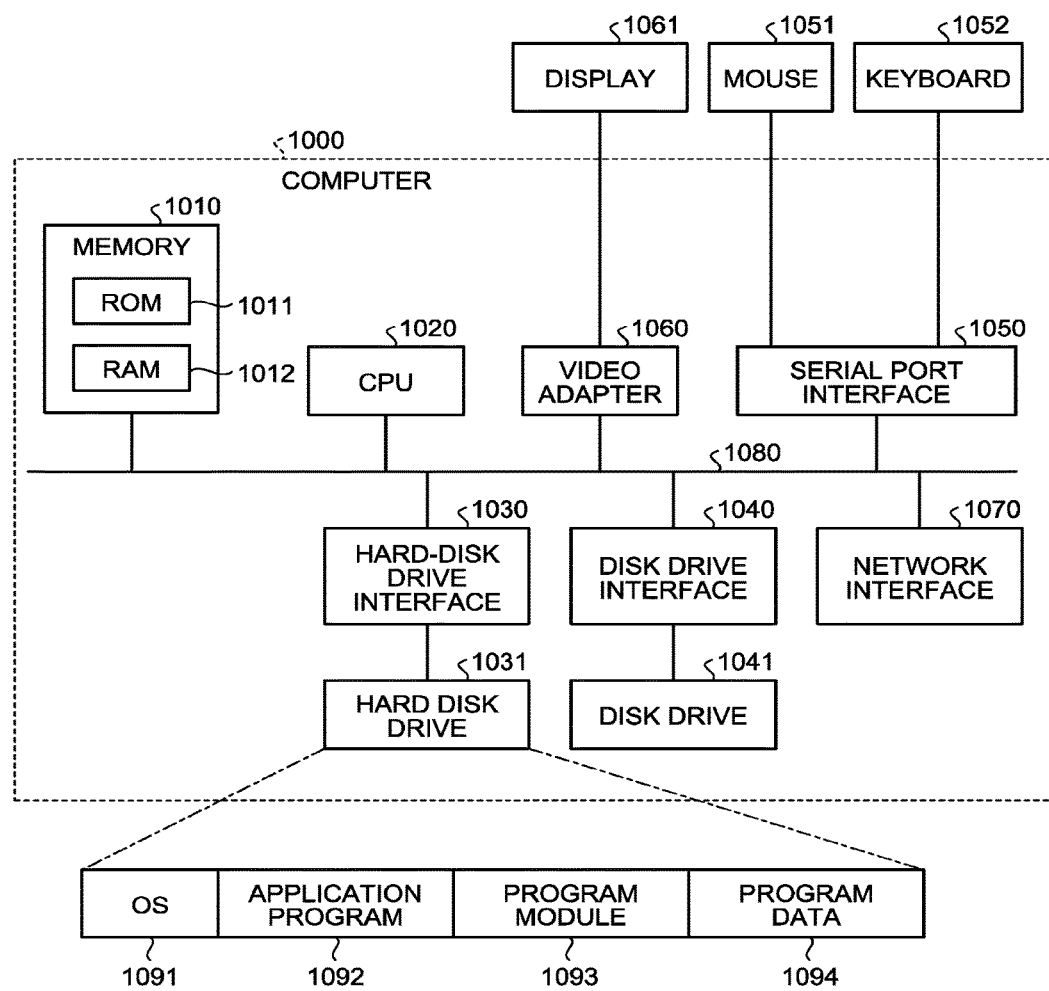
FIG. 12 is a diagram illustrating a computer that executes a dynamically-loaded code analysis program.

FIG. 12 is a diagram illustrating a computer 1000 that executes the dynamically-loaded code analysis program. As exemplified in FIG. 12, for example the computer 1000 includes a memory 1010, a CPU 1020, a hard-disk drive interface 1030, a disk drive interface 1040, a serial port interface 1050, a video adapter 1060, and a network interface 1070. These respective units are connected to each other by a bus 1080.

As exemplified in FIG. 12, the memory 1010 includes a ROM (Read Only Memory) 1011 and a RAM 1012. The ROM 1011 memorizes a boot program such as a BIOS (Basic Input Output System). As exemplified in FIG. 12, the hard-disk drive interface 1030 is connected to a hard disk drive 1031. As exemplified in FIG. 12, the disk drive interface 1040 is connected to a disk drive 1041. For example, a detachable memory medium such as a magnetic disk or an optical disk is inserted into the disk drive 1041. As exemplified in FIG. 12, the serial port interface 1050 is connected to, for example, a mouse 1051 and a keyboard 1052. As exemplified in FIG. 12, the video adapter 1060 is connected to a display 1061.

As exemplified in FIG. 12, for example, the hard disk drive 1031 memorizes an OS 1091, an application program 1092, a program module 1093, and program data 1094. That is, the dynamically-loaded code analysis program described above is memorized in, for example, the hard disk drive 1031 as a program module in which a command performed by the computer 1000 is written. Specifically, a program module in which an extraction procedure to perform information processing similar to that of the extraction unit 14*c* described in the embodiments described above, and a specification procedure to perform the information processing similar to that of the specification unit 14*d* are written is memorized in the hard disk drive 1031.

Various pieces of data described in the first embodiment described above are memorized in, for example, the memory 1010 or the hard disk drive 1031 as the program data. The CPU 1020 reads out the program module 1093 and the program data 1094 memorized in the memory 1010 or the hard disk drive 1031 to the RAM 1012 as required, to perform various process procedures.

The program module 1093 and the program data 1094 related to the dynamically-loaded code analysis program can be not only memorized in the hard disk drive 1031 but also memorized in, for example, a detachable memory medium, and can be read out by the CPU 1020 via the disk drive or the like. Alternatively, the program module 1093 and the program data 1094 related to the dynamically-loaded code analysis program can be memorized in another computer connected thereto via a network (a LAN (Local Area Network), a WAN (Wide Area Network), or the like), and read by the CPU 1020 via the network interface 1070.

REFERENCE SIGNS LIST 10, 100 dynamically-loaded code analysis device
11 input unit
12 output unit
13 communication control unit
14, 140 control unit
14*a* dynamically-loaded code information generation unit
14*b* call-method information generation unit
14*c* extraction unit
14*d* specification unit
14*e* tag-information control unit
14*f* storage control unit
15, 150 memory unit
15*a* tag-information memory unit
15*b* dynamically-loaded code information memory unit
15*c* call-method information memory unit
15*d* user-information memory unit
15*e* trace-information memory unit

The invention claimed is:

1. A dynamically-loaded code analysis device comprising:
a memory that memorizes dynamically-loaded code information indicating a class structure of a dynamically-loaded code and call method information in which tag information added to user information is associated with a class structure of a code performed for the user information, for each of the dynamically-loaded codes acquired via a network; and
processing circuitry configured to
detect transmission of user information to another device and specifies tag information that matches tag information added to the detected user information from the call method information memorized in the memory, to extract a class structure associated with the specified tag information; and
search the memory for dynamically-loaded code information indicating the extracted class structure, to specify a dynamically-loaded code corresponding to the searched dynamically-loaded code information.

2. The dynamically-loaded code analysis device according to claim 1, wherein upon detection of transmission of user information, the processing circuitry searches the memory for dynamically-loaded code information indicating the extracted class structure, to specify a dynamically-loaded code corresponding to the searched dynamically-loaded code information.

3. The dynamically-loaded code analysis device according to claim 1, wherein the processing circuitry is configured to
store the extracted class structure in the memory, and
read out the extracted class structure from the memory at a predetermined interval, and search the memory for dynamically-loaded code information indicating the read extracted class structure to specify a dynamically-loaded code corresponding to the searched dynamically-loaded code information.

4. The dynamically-loaded code analysis device according to claim 1, wherein
the class structure of the dynamically-loaded code includes a package name and a class name,
the class structure of the code performed for the user information includes a package name and a class name, and
the processing circuitry specifies the dynamically-loaded code including a package name and a class name that match the package name and the class name of the code performed for the user information.

5. The dynamically-loaded code analysis device according to claim 1, the processing circuitry being configured to
generate the dynamically-loaded code information by analyzing a dynamically-loaded code acquired via a network and stores the generated dynamically-loaded code information in the memory and
generate the call method information by analyzing a code to be performed in arithmetic processing, when the arithmetic processing is performed for the user information, and stores the generated call method information in the memory.

6. The dynamically-loaded code analysis device according to claim 4, the processing circuitry being configured to
generate the dynamically-loaded code information by analyzing a dynamically-loaded code acquired via a network and stores the generated dynamically-loaded code information in the memory; and
generate the call method information by analyzing a code to be performed in arithmetic processing, when the arithmetic processing is performed for the user information, and stores the generated call method information in the memory.

7. A dynamically-loaded code analysis method performed by a dynamically-loaded code analysis device, wherein
the dynamically-loaded code analysis device includes a memory that memorizes dynamically-loaded code information indicating a class structure of a dynamically-loaded code and call method information in which tag information added to user information is associated with a class structure of a code performed for the user information, for each of the dynamically-loaded codes acquired via a network, and
the dynamically-loaded code analysis method includes
an extraction step of detecting transmission of user information to another device and specifying tag information that matches the tag information added to the detected user information from the call method information memorized in the memory, to extract a class structure associated with the specified tag information by the dynamically-loaded code analysis device, and
a specification step of searching the memory for dynamically-loaded code information indicating the extracted class structure, to specify a dynamically-loaded code corresponding to the searched dynamically-loaded code information by the dynamically-loaded code analysis device.

8. A non-transitory computer-readable recording medium having stored a dynamically-loaded code analysis program causing a computer to execute a process comprising:
an extraction procedure of detecting transmission of user information to another device and specifying tag information that matches tag information added to the detected user information from call method information memorized in a memory which memorizes dynamically-loaded code information indicating a class structure of a dynamically-loaded code and the call method information in which tag information added to user information is associated with the class structure of a code performed for the user information, for each of the dynamically-loaded codes acquired via a network, to extract a class structure associated with the specified tag information, and
a specification procedure of searching the memory for dynamically-loaded code information indicating the extracted class structure, to specify a dynamically-loaded code corresponding to the searched dynamically-loaded code information.

* * * * *